July 7, 1953 — H. D. HUME — 2,644,289
HARVESTER REEL

Filed Oct. 31, 1949 — 5 Sheets-Sheet 1

INVENTOR.
Horace D. Hume
BY
Fred Wells
Atty

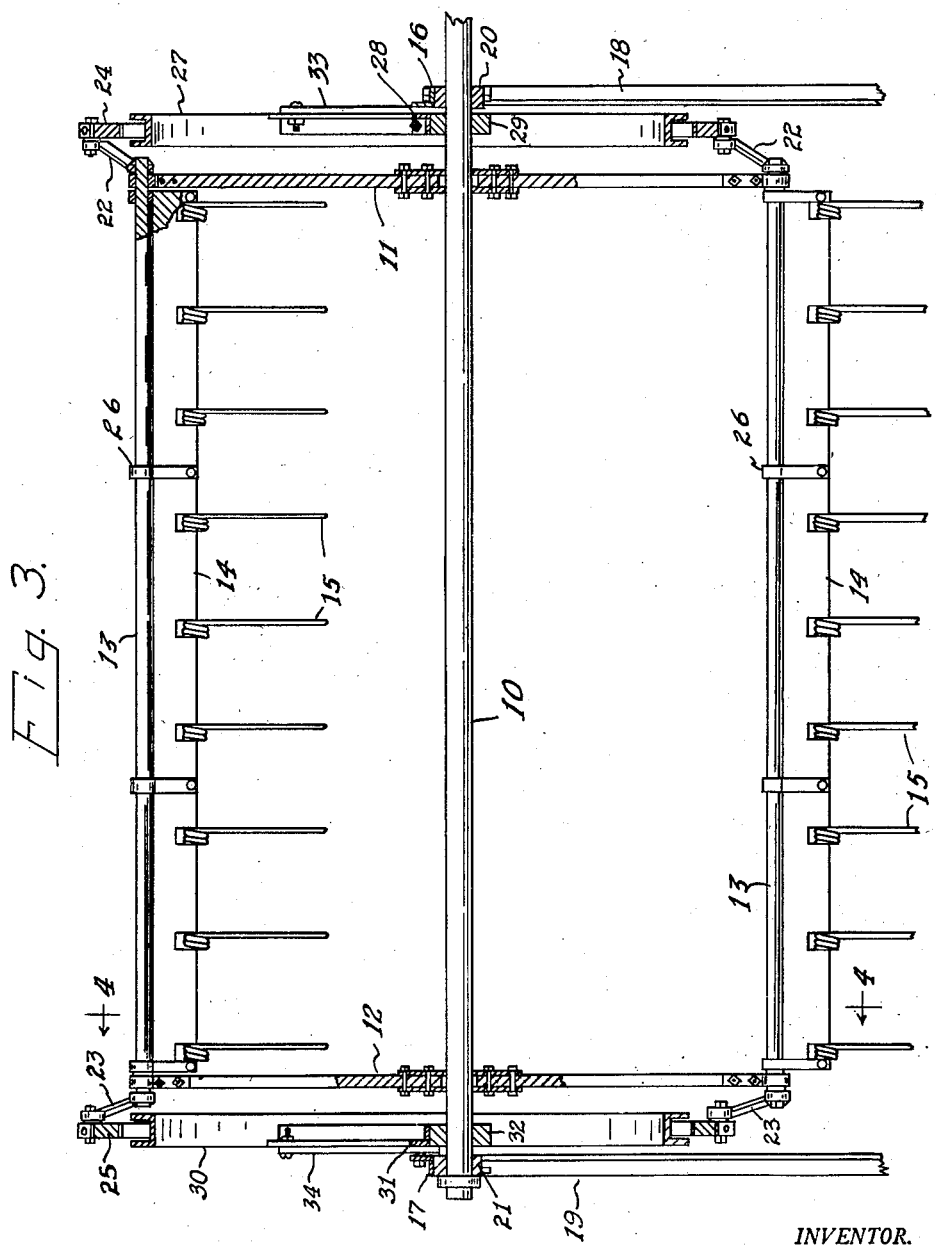

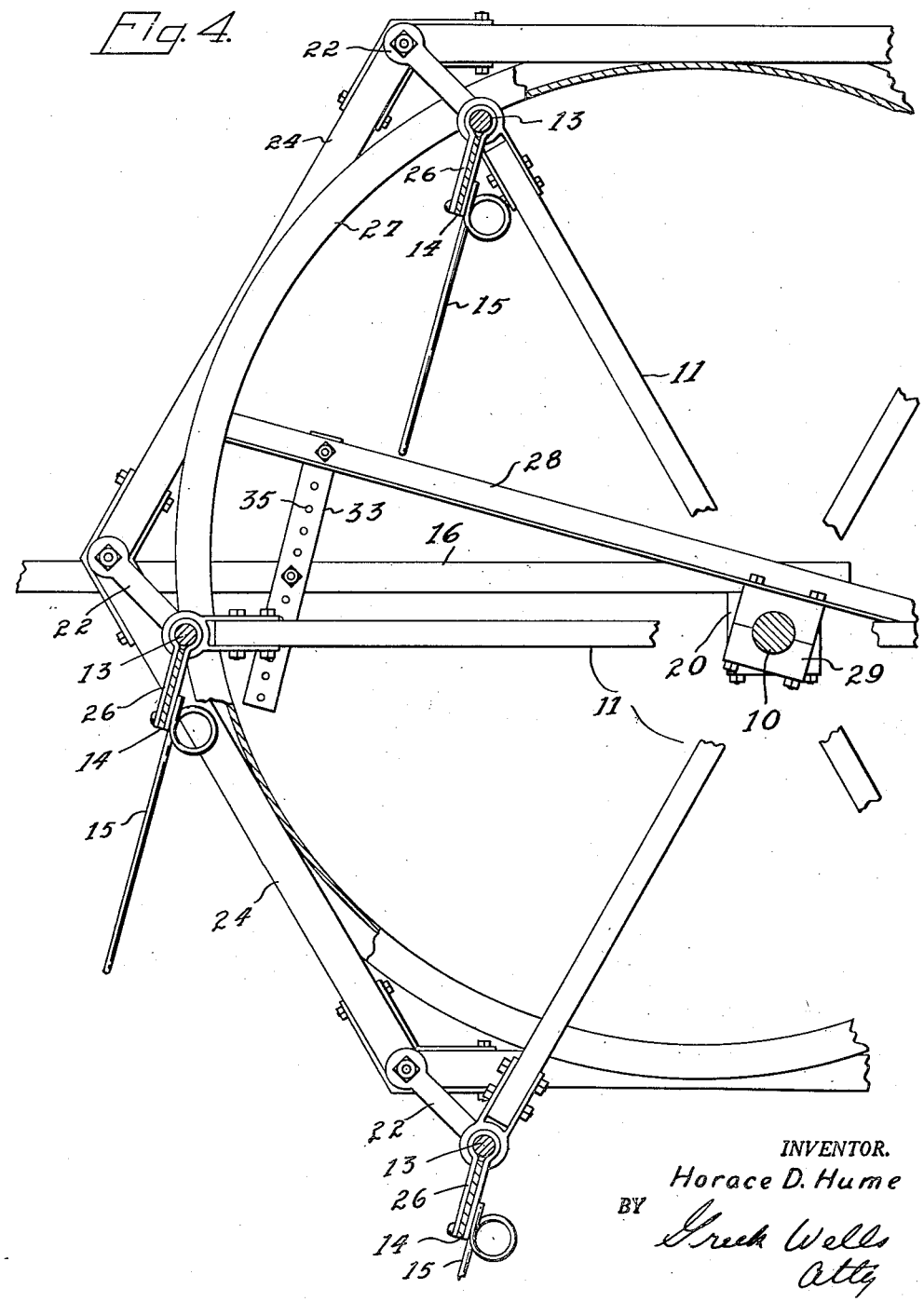

July 7, 1953    H. D. HUME    2,644,289
HARVESTER REEL
Filed Oct. 31, 1949    5 Sheets-Sheet 4
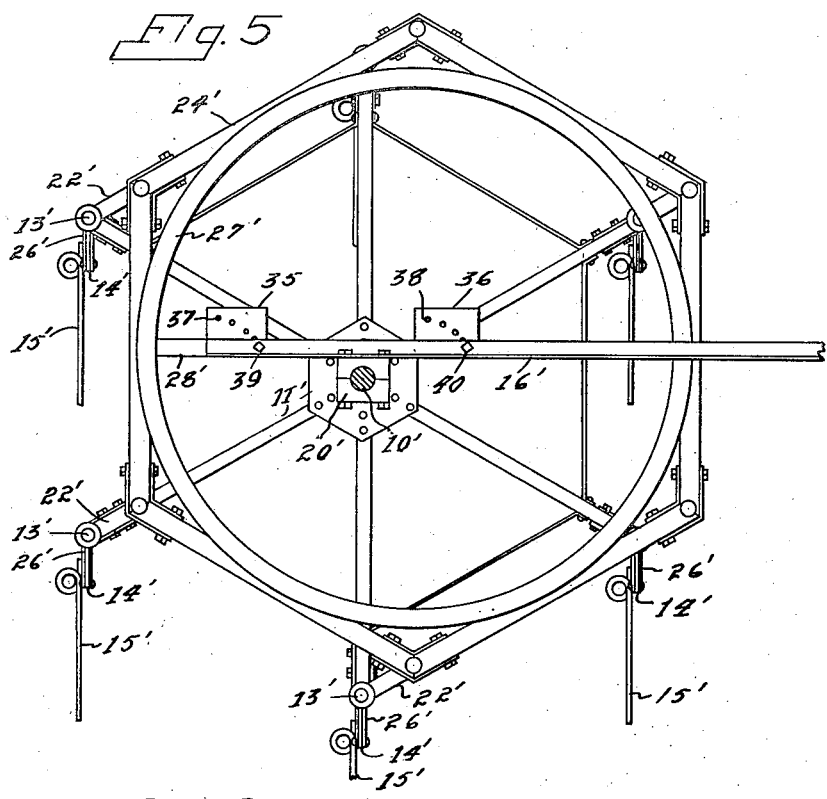
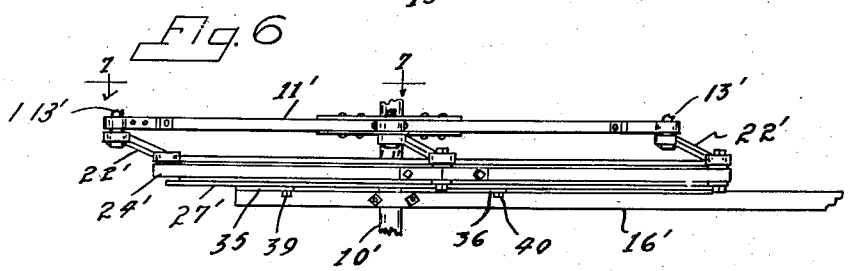
INVENTOR.
Horace D. Hume
BY Greek Wells
atty

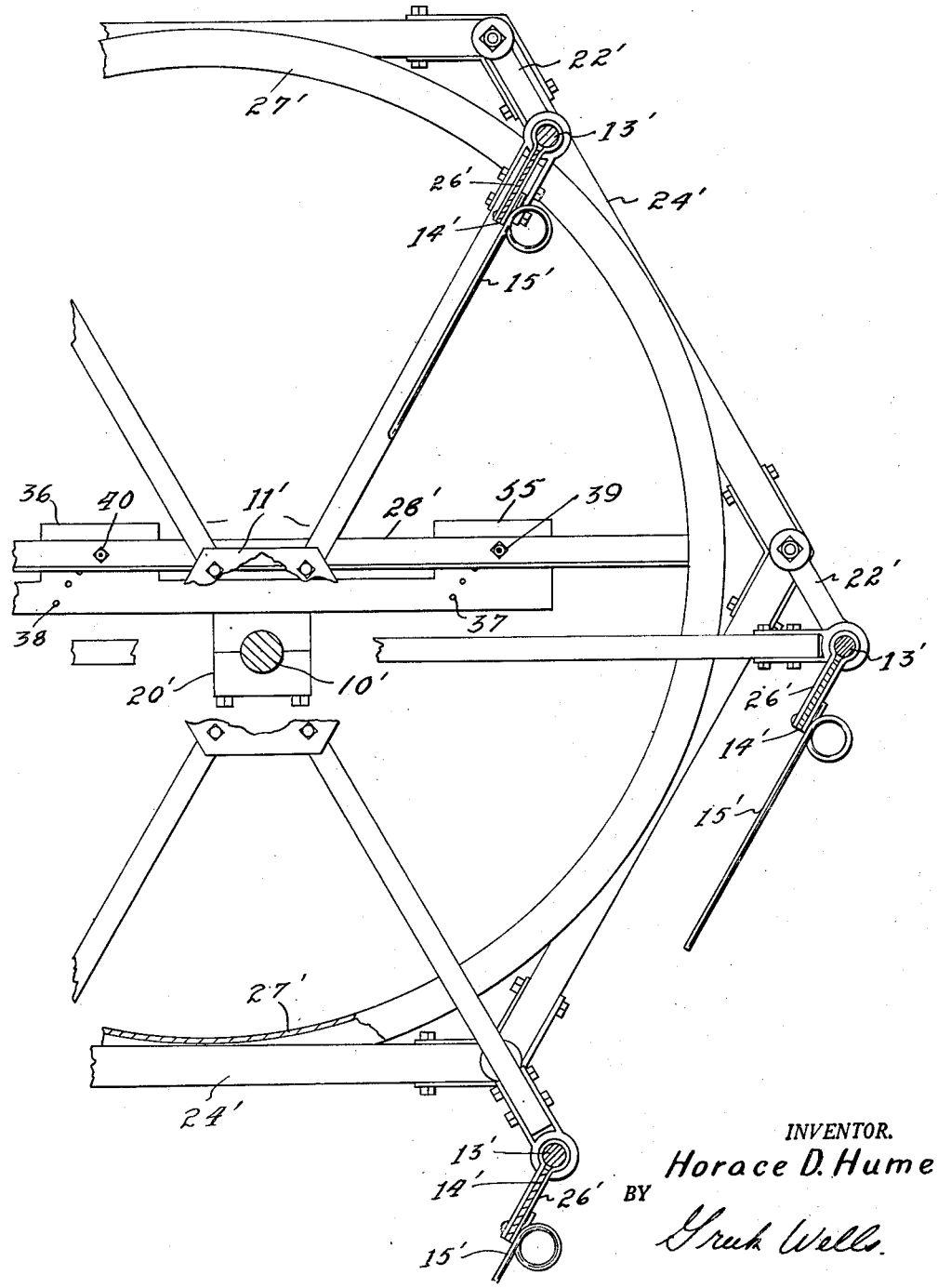

Patented July 7, 1953

2,644,289

UNITED STATES PATENT OFFICE 2,644,289

HARVESTER REEL

Horace D. Hume, Mendota, Ill.

Application October 31, 1949, Serial No. 124,600

6 Claims. (Cl. 56—226)

My present invention relates to improvements in a harvester reel.

It is the purpose of my invention to provide, in a harvester reel including tines that have a supplemental rotary movement, an improved and simplified means to mount the frames that control the supplemental rotary movement of the tines as the reel rotates.

In harvester reels including the tines that have supplemental rotary movement, the tines are affixed to tine shafts. These tine shafts are journalled in the reel frames. Crank arms fixed to the tine shafts are connected to an operating member that rotates about an axis that is offset from the axis of rotation of the reel. This operating member is generally a rigid frame having bearings for the crank arms. The prior Patent No. 2,102,709 granted December 21, 1937, to James E. Love and myself, shows the combination of the reel with the tine shafts, the tines, the tine operating frame and an auxiliary frame for bracing the tine shafts and stabilizing the independent rotary movement of the tine shafts. My present invention is applicable to the mounting of the operating frame and the auxiliary frame in such a device. It is also applicable to those reels where the operating frame only is used.

With my present invention the operating frame consists only of a rigid polygonal ring with bearings for the crank arms. It is mounted in a circular channel like ring member carried by the reel mounting. When an auxiliary stabilizing frame is used, the same mounting may be employed for the auxiliary frame.

The noval features that I consider characteristic of my invention are set forth with particularity in the appended claims. The invention itself, however, together with additional objects and advantages thereof, will best be understood from the following description when read in connection with the accompanying drawings.

In the drawings:

Figure 3 is a sectional view taken on the line 3—3 of Figure 1;

Figure 4 is an enlarged fragmentary sectional view taken on the line 4—4 of Figure 3 with parts broken away, showing a changed position of the operating frame mounting member;

Figure 5 is an end view of a reel illustrating a modified construction for positioning the operating frame mounting member;

Figure 6 is a plan view of one end of the reel shown in Figure 5; and

Figure 7 is an enlarged fragmentary sectional view on the line 7—7 of Figure 6 with parts broken away.

Figure 1:
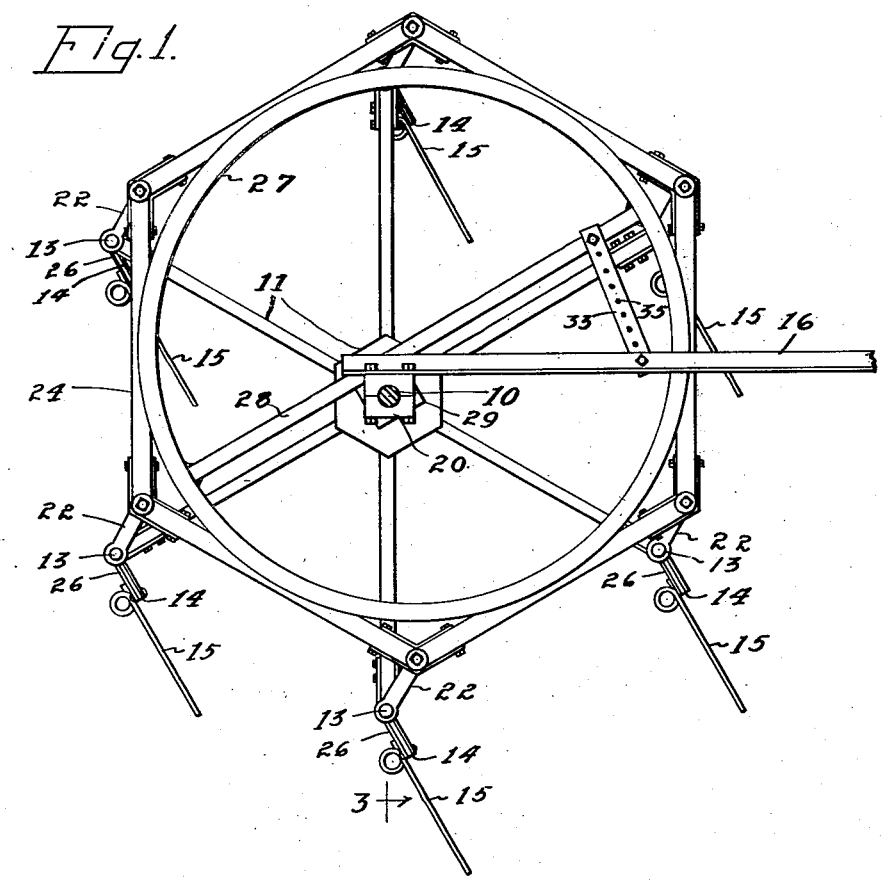
Figure 1 is an end view of a reel embodying my invention with the reel shaft shown in section.
Figure 2:
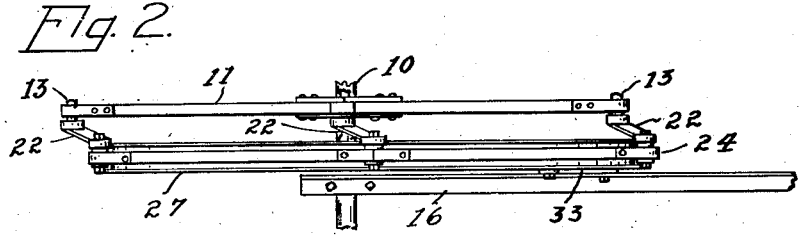
Figure 2 is a plan view of one end of the reel.

Referring now to Figures 1 to 4 of the drawings, my invention is illustrated in connection with a harvester reel having a shaft 10, reel heads 11 and 12, tine shafts 13, bats 14 and tines 15. The reel is supported by carrier arms 16 and 17 that extend forwardly from frame members 18 and 19. Suitable bearings 20 and 21 mount the shaft 10 on the carrier arms 16 and 17.

The present invention is concerned with the means for causing supplemental movement of the tines 15. Each of the tine shafts 13 has crank arms 22 and 23 fixed thereto at its opposite ends. The crank arms 22 are pivoted in a polygonal frame 24. The crank arms 23 are pivoted on a second polygonal frame 25. The tine shafts 13 are pivoted in the reel heads 11 and 12 and have straps 26 fixed thereon which support the bats 14. The tines 15 are fixed on the bats 14.

A circular member 27 supports the frame 24. This circular member is channel shaped in cross section so that the frame 24 can rotate in the channel of the circular member 27. The circular member has a cross bar 28 which is mounted on a bearing 29 which in turn is mounted on the shaft 10. The bearing 29 is eccentric to the center of the circular channel member 27 as illustrated in Figure 1. The frame 25 is supported by a second circular channel member 30 which has a cross bar 31 supported by a bearing 32 on the shaft 10. The bearing 32 is offset from the center of the member 30 the same amount that the bearing 29 is offset from the member 27.

The position of the tines 15 can be adjusted with respect to the vertical by turning the cross bars 28 and 31 with respect to the carrier arms 16 and 17. In order to hold the cross bars 28 and 31 in the desired position, I employ adjustable link means comprising apertured straps 33 and 34, the straps being connected by bolts to the respective carrier arms and cross bars. The straps are provided with a series of apertures 35 so that any desired adjustment can be made.

It is believed to be clear from Figures 1 to 4 that upon rotation of the reel by power applied to the shaft 10, the frames 24 and 25 will be rotated on their respective circular channels 27 and 30 and will cause the tine shafts 13 to rotate in their reel mountings so that the tines always point downward at the desired angle to the vertical as governed by the setting of the straps 33 and 34. This construction interposes no movable parts between the frames 24 and 25 and the reel shaft 10. Since the circular channel members 27 and 30 are rigidly connected to the carrier arms, a very stable mounting is provided for the frames 24 and 25.

Referring now to Figures 5 to 7 inclusive, the construction in these figures is essentially the same as that in Figures 1 to 4 except for the manner of supporting the circular channel members. According to these figures each circular channel member such as 27' has its cross bar 28' supported directly on the carrier arm 16'. The carrier arm is provided with two upstanding plates 35 and 36. These plates are provided with curved rows of apertures 37 and 38 so that the cross bar 28' can be bolted to the plates 35 and 36 by bolts 39 and 40. The cross bar 28' is shown at its lowermost position in Figure 5 so that the tines 15' extend straight downward. By raising the cross bar 28' to the position shown in Figure 7 of the drawings, the entire channel member 27' is moved upwardly and laterally so as to turn the tines 15' to the angle shown in Figure 7.

The circular channel members such as 27 and 30 can be used at both ends of the reel or at one end only if a stabilizing polygonal frame is not needed. Also the auxiliary stabilizing frame can be carried on the circular channel member and the operating frame member can be mounted as shown in the prior patent referred to hereinbefore.

The circular channel members supporting the polygonal frames decrease the weight that must be rotated and make it unnecessary to provide any braces or central connection for the polygonal frames. The polygonal frames can be made lighter than heretofore since their only function is to interconnect the crank arms rigidly in order to rotate the tines with respect to the reel as the reel shaft is rotated.

It is believed that the nature and advantages of my invention will be clear from the foregoing description and accompanying drawings.

Having thus described my invention, I claim:

1. The combination with a rotary reel, a series of tines thereon capable of a supplemental movement, and carrier arms supporting said reel, of a circular channel member secured on one of said arms with its axis eccentric to the reel axis, a polygonal frame having the intermediate portions of the sides thereof seated in the channel member to rotate thereon and crank arms connecting the frame and said series of tines.

2. The combination with a rotary reel, a plurality of tine shafts journalled thereon having tines secured thereto, and carrier arms supporting said reel, of a circular channel member secured on one of said arms with its axis eccentric to the reel axis, a polygonal frame having the intermediate portions of the sides thereof seated in the channel of said circular channel member to rotate thereon and crank arms on the tine shafts having their ends pivoted on said frame.

3. The combination with a rotary reel, including a supporting shaft and a plurality of shafts arranged about the supporting shaft for supporting bats and tines, of carrier arms on which the supporting shaft is mounted for rotation, crank arms on said plurality of shafts, a polygonal frame to the corners of which the free ends of the crank arms are pivoted, a bearing on said supporting shaft, a circular channel member rotatably supporting the frame and having a cross bar to which said bearing is secured eccentrically of the channel member, and means connecting the cross bar to one of said carrier arms at a distance from the supporting shaft.

4. The combination with a rotary reel, including a supporting shaft and a plurality of shafts arranged about the supporting shaft for supporting bats and tines of carrier arms on which the supporting shaft is mounted for rotation, crank arms on said plurality of shafts, a polygonal frame to the corners of which the free ends of the crank arms are pivoted, a bearing on said supporting shaft, a circular channel member rotatably supporting the frame and having a cross bar to which said bearing is secured eccentrically of the channel member, and adjustable link means connecting the cross bar to one of said carrier arms at a distance from the supporting shaft.

5. The combination with a rotary reel, including a supporting shaft and a plurality of shafts arranged about the supporting shaft for supporting bats and tines, of carrier arms on which the supporting shaft is mounted for rotation, crank arms on said plurality of shafts, a polygonal frame to the corners of which the free ends of the crank arms are pivoted, a circular channel member carried by one of said carrier arms, the sides of said polygonal frame being seated in the channel of said member, and said member having its axis eccentric with respect to the supporting shaft.

6. The combination with a rotary reel, including a supporting shaft and a plurality of shafts arranged about the supporting shaft for supporting bats and tines, of carrier arms on which the supporting shaft is mounted for rotation, crank arms on said plurality of shafts, a polygonal frame to the corners of which the free ends of the crank arms are pivoted, one of said carrier arms having spaced mounting plates thereon, a circular channel member having its axis eccentric to the supporting shaft and having a cross bar bolted to said plates, and the sides of said polygonal frame being seated in the channel of said member.

HORACE D. HUME.

References Cited in the file of this patent

UNITED STATES PATENTS

| Number | Name | Date |
|---|---|---|
| 1,908,082 | Tinsley | May 9, 1933 |
| 2,380,173 | Harrison | July 10, 1945 |
| 2,497,729 | Heth et al. | Feb. 14, 1950 |